(12) United States Patent
Sugaya

(10) Patent No.: US 10,846,326 B2
(45) Date of Patent: Nov. 24, 2020

(54) SYSTEM AND METHOD FOR CONTROLLING CAMERA AND PROGRAM

(71) Applicant: OPTiM Corporation, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 0 days.

(21) Appl. No.: 15/771,580

(22) PCT Filed: Nov. 30, 2016

(86) PCT No.: PCT/JP2016/085563
§ 371 (c)(1),
(2) Date: Apr. 27, 2018

(87) PCT Pub. No.: WO2018/100676
PCT Pub. Date: Jun. 7, 2018

(65) Prior Publication Data
US 2019/0340197 A1 Nov. 7, 2019

(51) Int. Cl.
*G06F 16/583* (2019.01)
*G06K 9/62* (2006.01)
*G06T 7/00* (2017.01)
*H04N 5/232* (2006.01)

(52) U.S. Cl.
CPC ........ *G06F 16/5854* (2019.01); *G06K 9/6211* (2013.01); *G06T 7/0002* (2013.01); *H04N 5/232* (2013.01)

(58) Field of Classification Search
CPC . G06F 16/5854; G06K 9/6211; G06T 7/0002; H04N 5/232
See application file for complete search history.

(56) References Cited

U.S. PATENT DOCUMENTS

| | | | | |
|---|---|---|---|---|
| 2007/0019094 A1* | 1/2007 | Silberstein | ............. | H04N 5/225 348/333.01 |
| 2013/0021487 A1* | 1/2013 | Ishino | .................... | H04N 5/232 348/220.1 |
| 2016/0098636 A1* | 4/2016 | Okonogi | ................ | G06N 20/00 706/12 |
| 2017/0028562 A1* | 2/2017 | Yamazaki | ............. | B25J 9/1697 |
| 2018/0247714 A1* | 8/2018 | Lee | ........................ | A61B 6/037 |

(Continued)

FOREIGN PATENT DOCUMENTS

| | | |
|---|---|---|
| JP | 2003-308524 | 10/2003 |
| JP | 2003308524 A | * 10/2003 |
| JP | 2015-056713 | 3/2015 |

(Continued)

*Primary Examiner* — Antoinette T Spinks
(74) *Attorney, Agent, or Firm* — Lex IP Meister, PLLC

(57) ABSTRACT

The present invention is to improve the detection and the identification accuracy of an object in image analysis in a camera control system that controls a camera used to take an image to be analyzed by artificial intelligence. The image analysis system that performs machine learning by using a plurality of teacher data associating a label that indicates what the object is with image data to which the label is attached, includes an imaging condition analysis module 211 that analyzes the imaging condition of teacher data; and a camera control module 212 that controls a camera to take an image under the analyzed imaging condition, to analyze the image taken under the imaging condition.

9 Claims, 12 Drawing Sheets

(56) References Cited

U.S. PATENT DOCUMENTS

2018/0376050 A1* 12/2018 Endo .................. H04N 5/04
2020/0254622 A1* 8/2020 Yamazaki ............ B25J 9/163

FOREIGN PATENT DOCUMENTS

| JP | 2015056713 A | * | 3/2015 |
| WO | 2010/101186 | | 9/2010 |
| WO | 2013/099367 | | 7/2013 |

* cited by examiner

| Data Name | Image File | Label | Resolution | Angle of Camera | Magnification | Distance |
|---|---|---|---|---|---|---|
| Teacher data 1 | ImageA | Human | 1280x720 | 80° | 4 times | 8 m |
| Teacher data 2 | ImageB | Car | 1920x1080 | 15° | life size | 10 m |
| Teacher data 3 | ImageC | Mobile phone | 640x480 | 60° | 2 times | 5 m |
| Teacher data 4 | ImageD | Plant | | | | |
| ⋮ | | | | | | |

ImageA
label : Human

ImageB
label : Car

ImageC
label : Mobile phone

ImageD
label : Plant

SYSTEM AND METHOD FOR CONTROLLING CAMERA AND PROGRAM

TECHNICAL FIELD

The present invention relates to a system and a method for controlling a camera and a program to improve the detection and the identification accuracy of an object in image analysis in a camera control system that controls a camera used to take an image to be analyzed by artificial intelligence.

BACKGROUND ART

As the technique of machine learning by which artificial intelligence analyzes an image, supervised learning is known well. Generally, it is necessary to prepare a large number of images for the supervised learning. Thus, the method for increasing the number of learning images by processing the reference image by imitating the defocused or the blurred image taken by a camera is proposed (Patent Document 1).

CITATION LIST

Patent Literature

Patent Document 1: WO 2010101186 A1

SUMMARY OF INVENTION

The method of Patent Document 1 can merely increase the number of images and generate an image for learning as teacher data. However, if the resolution of the image as teacher data, the angle of a camera taking the image, and the like are different from those actually taken image, an object in the actually taken image may not be detected or identified well.

To solve this problem, the present inventor focused on the fact that the detection and the identification accuracy of an object can be improved by taking an image at the resolution of the image as teacher data and the angle of a camera taking the image and analyzing this taken image.

An objective of the present invention is to provide a system and a method for controlling a camera and a program to improve the detection and the identification accuracy of an object in image analysis in a camera control system that controls a camera used to take an image to be analyzed by artificial intelligence.

The first aspect of the present invention provides a system for controlling a camera used to take an image to be analyzed by artificial intelligence, including:

an imaging condition analysis unit that analyzes the imaging condition of teacher data; and a camera control unit that controls a camera to take an image under the analyzed imaging condition.

According to the first aspect of the present invention, the system for controlling a camera used to take an image to be analyzed by artificial intelligence includes: an imaging condition analysis unit that analyzes the imaging condition of teacher data; and a camera control unit that controls a camera to take an image under the analyzed imaging condition.

The first aspect of the present invention is the category of a system for controlling a camera, but the categories of a method for controlling a camera and a program have similar functions and effects.

The second aspect of the present invention provides the system according to the first aspect of the present invention, further including a teacher data selection unit that selects one or more teacher data from a plurality of teacher data if a plurality of teacher data are analyzed by the imaging condition analysis unit, in which the camera control unit controls a camera to take an image under the imaging condition of the selected teacher data.

According to the second aspect of the present invention, the system according to the first aspect of the present invention, further includes: a teacher data selection unit that selects one or more teacher data from a plurality of teacher data if a plurality of teacher data are analyzed by the imaging condition analysis unit, in which the camera control unit controls a camera to take an image under the imaging condition of the selected teacher data.

The third aspect of the present invention provides the system according to the first or the second aspect of the present invention, further including a receiving unit that receives input of the teacher data.

According to the third aspect of the present invention, the system according to the first or the second aspect of the present invention, further includes a receiving unit that receives input of the teacher data.

The fourth aspect of the present invention provides the system according to any one of the first to the third aspects of the present invention, in which the imaging condition includes at least one of a resolution, the angle of a camera, and a magnification.

According to the fourth aspect of the present invention, in the system according to any one of the first to the third aspects of the present invention, the imaging condition includes at least one of a resolution, the angle of a camera, and a magnification.

The fifth aspect of the present invention provides the system according to any one of the first to the fourth aspects of the present invention, further including a flight control unit that controls a drone to fly to a position that meets the analyzed imaging condition if the camera is provided in the drone.

According to the fifth aspect of the present invention, the system according to any one of the first to the fourth aspects of the present invention, further includes a flight control unit that controls a drone to fly to a position that meets the analyzed imaging condition if the camera is provided in the drone.

The sixth aspect of the present invention provides a method for controlling a camera used to take an image to be analyzed by artificial intelligence, including the steps of;

analyzing the imaging condition of teacher data; and controlling a camera to take an image under the analyzed imaging condition.

The seventh aspect of the present invention provides a program to cause a system for controlling a camera used to take an image to be analyzed by artificial intelligence to execute the steps of;

analyzing the imaging condition of teacher data; and controlling a camera to take an image under the analyzed imaging condition.

The present invention can provide a system and a method for controlling a camera and a program to improve the detection and the identification accuracy of an object in image analysis in a camera control system that controls a camera used to take an image to be analyzed by artificial intelligence.

DESCRIPTION OF EMBODIMENTS

Embodiments of the present invention will be described below with reference to the attached drawings. However, this is illustrative only, and the technological scope of the present invention is not limited thereto.

Overview of System for Controlling a Camera

Figure 1:
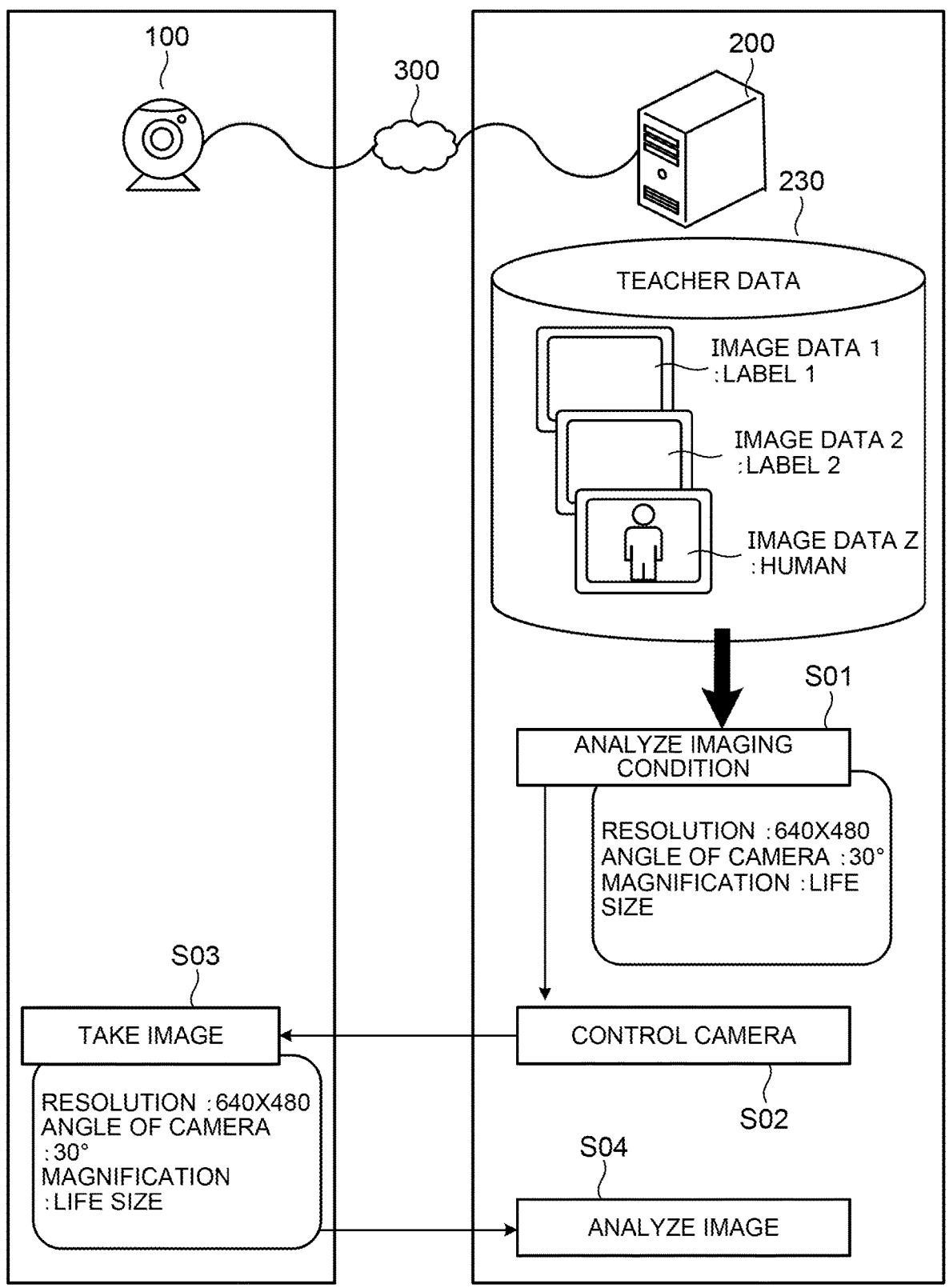
FIG. 1 shows a schematic diagram of a preferable embodiment of the present invention.

FIG. 1 shows a schematic diagram of a preferable embodiment of the present invention. The overview of the present invention will be described below with reference to FIG. 1. The system for controlling a camera includes a camera 100, a computer 200, and a communication network 300.

In FIG. 1, the number of the cameras 100 is not limited to one and may be two or more. Furthermore, the computer 200 is not limited to actual devices and may be virtual devices.

Figure 2:
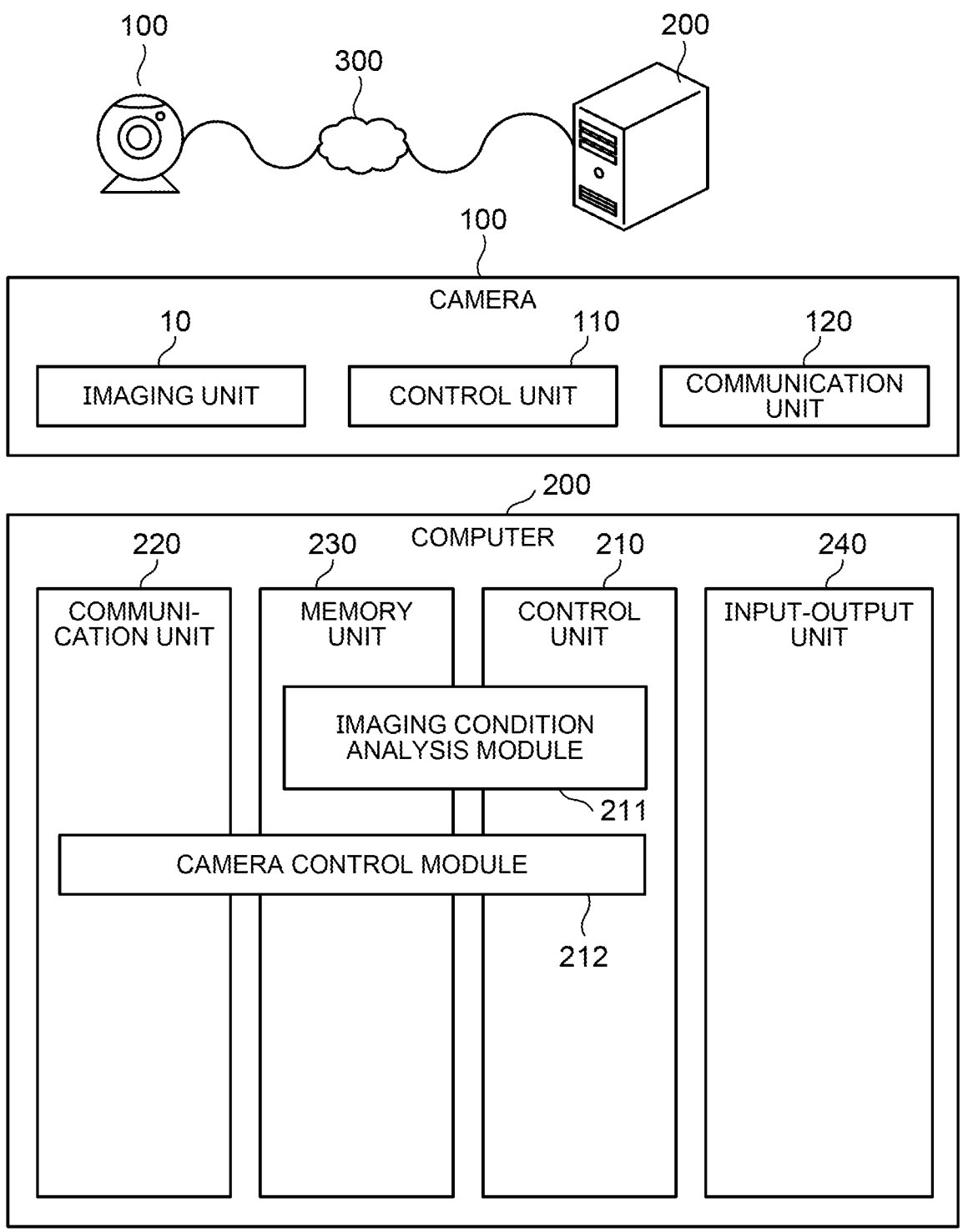
FIG. 2 shows a functional block diagram of the camera 100 and the computer 200 to illustrate the relationship among the functions.

The camera 100 includes an imaging unit 10, a control unit 110, and a communication unit 120 as shown in FIG. 2. The computer 200 includes a control unit 210, a communication unit 220, a memory unit 230, and an input-output unit 240 as shown in FIG. 2. The control unit 210 achieves an imaging condition analysis module 211 in cooperation with the memory unit 230. The control unit 210 achieves a camera control module 212 in cooperation with the communication unit 220 and the memory unit 230. The communication network 300 may be a public line network such as the Internet or a private line network, which enables the communication between the camera 100 and the computer 200.

The camera 100 is provided with imaging devices such as an imaging element and a lens, which is capable of data communication with the computer 200. The camera 100 is also capable of determine the distance to an object or to image an object from two or more different directions at the same time. The attached drawings show a WEB camera as an example of the camera 100. However, the camera 100 may be an imaging device provided with necessary functions, such as a digital camera, a digital video, a camera mounted on an uninhabited airborne vehicle or a wearable device, a security camera, a car-mounted camera, or a 360-degree camera.

The computer 200 is a computer device that is capable of data communication with the camera 100. The attached drawings show a desktop computer as an example of the computer 200. Examples of the computer 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

In the system for controlling a camera of FIG. 1, the computer 200 stores teacher data in the memory unit 230. The teacher data associates a label that indicates what the object is with image data to which the label is attached. For example, the label may be categorized into types such as humans, animals, and plants or more specific types such as adult males, adult females, dogs, cats, roses, and chrysanthemums. The teacher data to which a label for the purpose of the system, specifically how an object in an image is analyzed, is attached.

First, the imaging condition analysis module 211 of the computer 200 analyzes the imaging condition of the teacher data in the memory unit 230 (Step S01). The imaging condition includes at least one of a resolution, the angle of a camera, and a magnification.

Then, the camera control module 212 of the computer 200 controls the camera 100 to image an object under the analyzed imaging condition (Step S02).

The imaging unit 10 of the camera 100 is controlled by the computer 200 to take an image such as a still or moving image of an object under the specified image condition (Step S03).

Figure 10:
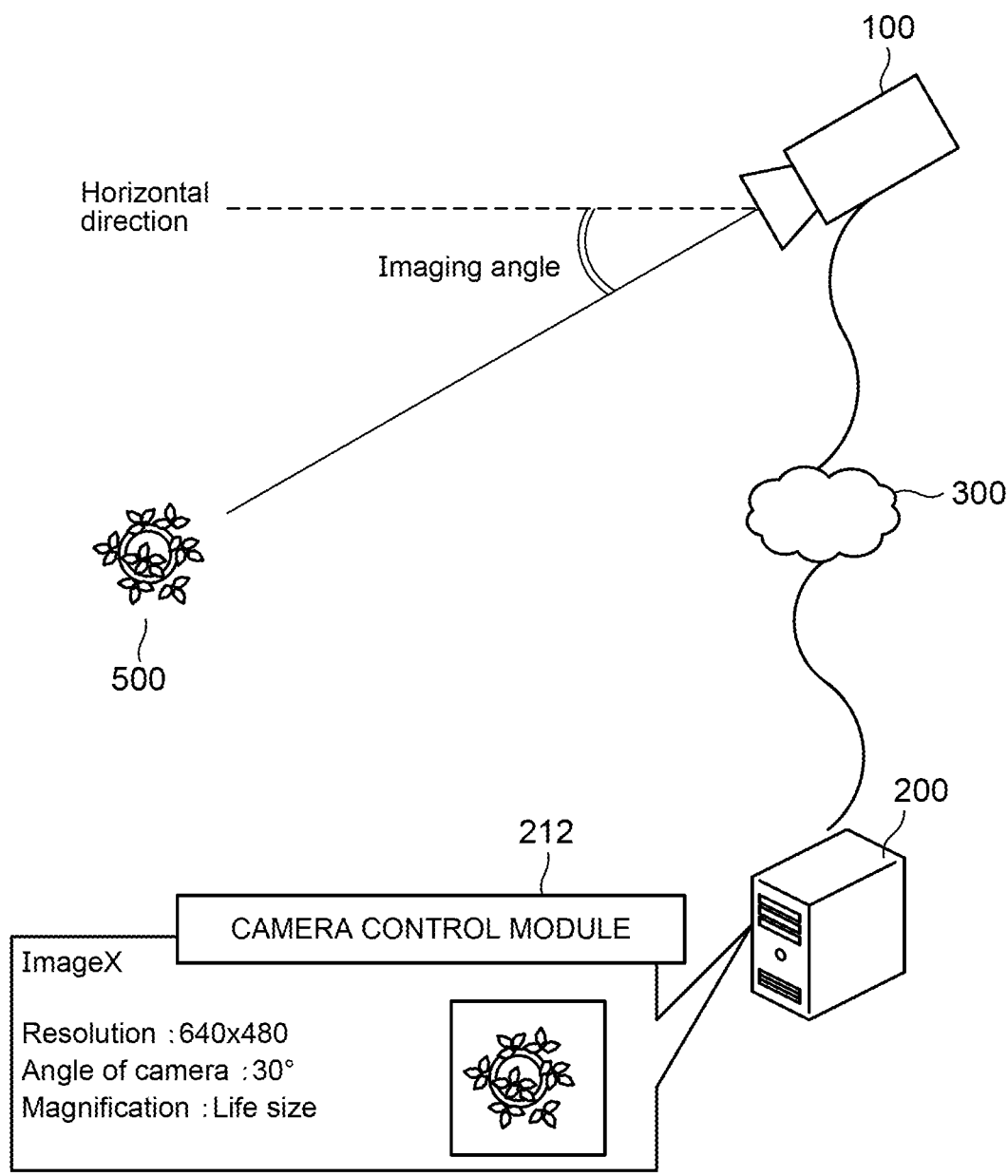
FIG. 10 shows one example where the camera 100 images an object 500.

FIG. 10 shows one example where the camera 100 images an object 500. This example shows that the camera control module 212 of the computer 200 controls the camera 100 connected with the communication network 300 to image ImageX under an imaging condition. If it is difficult to meet all the imaging conditions because the camera 100 is far from an object 500, the system may set priority on any one of the resolution, the angle of a camera, and the magnification, or the user may specify the priority.

Finally, the control unit 210 of the computer 200 acquires the image through the communication unit 220 and analyzes it (Step S04). In this example, "ImageX" is taken under the imaging condition: "resolution: 640×480 ppi, the angle of a camera: 30 degrees, magnification: life size," which is same as that of the teacher data so that the image analysis can result in high identification accuracy in a short time. The image analysis is appropriate for the purpose of the system, such as face recognition to identify individuals, distinguishing the situation of insect damage to food crops, checking the stock in warehouses, or image recognition of an affected area for medical diagnosis.

As described above, the present invention can provide a system and a method for controlling a camera and a program to improve the detection and the identification accuracy of an object in image analysis in a camera control system that controls a camera used to take an image to be analyzed by artificial intelligence.

Functions

FIG. 2 shows a functional block diagram of the camera 100 and the computer 200 to illustrate the relationship among the functions. The camera 100 includes an imaging unit 10, a control unit 110, and a communication unit 120.

The computer 200 includes a control unit 210, a communication unit 220, a memory unit 230, and an input-output unit 240. The control unit 210 achieves an imaging condition analysis module 211 in cooperation with the memory unit 230. The control unit 210 achieves a camera control module 212 in cooperation with the communication unit 220 and the memory unit 230. The communication network 300 may be a public line network such as the Internet or a private line network, which enables the communication between the camera 100 and the computer 200.

The camera 100 is provided with imaging devices such as an imaging element and a lens, which is capable of data communication with the computer 200. The camera 100 is also capable to determine the distance to an object or to image an object from two or more different directions at the same time. The attached drawings show a WEB camera as an example of the camera 100. However, the camera 100 may be an imaging device provided with necessary functions, such as a digital camera, a digital video, a camera mounted on an uninhabited airborne vehicle or a wearable device, a security camera, a car-mounted camera, or a 360-degree camera.

The camera 100 also includes an imaging unit 10 including a lens, an imaging device, various buttons, and a flash, which takes an image such as a still or moving image. The obtained taken image is an accurate image with information as much as the image analysis needs. The resolution, the angle of a camera, the magnification, etc., for imaging can be specified.

The control unit 110 includes a central processing unit (hereinafter referred to as "CPU"), a random access memory (hereinafter referred to as "RAM"), and a read only memory (hereinafter referred to as "ROM").

The communication unit 120 includes a device that is communicative to other devices, such as a Wireless Fidelity (Wi-Fi®) enabled device complying with, for example, IEEE 802.11, or a wireless device complying with the IMT-2000 standard such as the third and the fourth generation mobile communication systems. The communication unit may include a wired device for LAN connection.

The computer 200 is a computer device that is capable of data communication with the camera 100. The attached drawings show a desktop computer as an example of the computer 200. Examples of the computer 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

The control unit 210 includes a CPU, a RAM, and a ROM. The control unit 210 achieves an imaging condition analysis module 211 in cooperation with the communication unit 220. The control unit 210 achieves a camera control module 212 in cooperation with the communication unit 220 and the memory unit 230.

The communication unit 220 includes a device that is communicative to other devices, such as a Wi-Fi® enabled device complying with, for example, IEEE 802.11, or a wireless device complying with the IMT-2000 standard such as the third and the fourth generation mobile communication systems. The communication unit may include a wired device for LAN connection.

The memory unit 230 includes a data storage unit such as a hard disk or a semiconductor memory, which stores images and data necessary for processing teacher data, image analysis results, etc. The memory unit 230 may be provided with a database of teacher data.

The input-output unit 240 has functions necessary to use the system for controlling a camera. As an example to achieve the input, the input unit 240 may include a liquid crystal display with a touch panel function, a keyboard, a mouse, a pen tablet, a hardware button on the device, and a microphone to perform voice recognition. As an example to achieve the output, the input-output unit 240 may take forms such as a liquid crystal display, a PC display, and a projector to display images and output voices. The features of the present invention are not limited in particular by an input-output method.

Image Analysis Process

Figure 3:
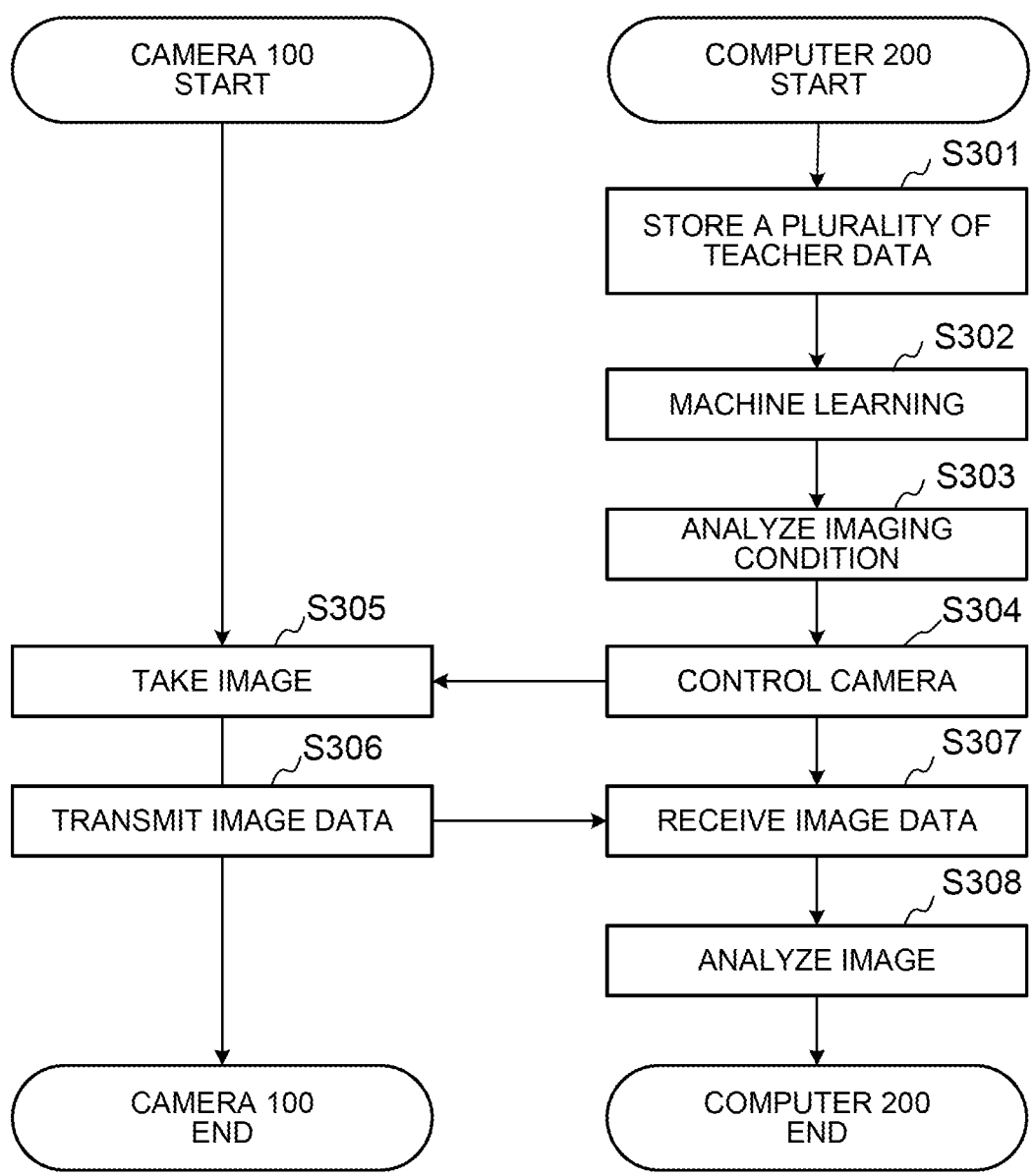
FIG. 3 shows a flow chart illustrating when the computer 200 analyzes an image taken by the camera 100.

FIG. 3 shows a flow chart illustrating the case where the computer 200 analyzes an image taken by the camera 100. The tasks executed by the modules will be described below with this process.

First, the computer 200 stores a plurality of teacher data associating a label that indicates what the object is with image data to which the label is attached in the memory unit 230 (Step S301). The memory unit 230 may be provided with a database of teacher data to store a plurality of teacher data. For example, the label may be categorized into types such as humans, animals, and plants or more specific types such as adult males, adult females, dogs, cats, roses, and chrysanthemums. The teacher data to which a label for the purpose of the system, specifically how an object in an image is analyzed, is attached. If a plurality of teacher data have already been stored, this process may be skipped.

Then, the computer 200 performs machine learning based on the teacher data stored in the memory unit 230 (Step S302). The machine learning is to analyze an image appropriately for the purpose of the system, specifically, how to recognize the object. For example, the purpose of the system may be face recognition to identify individuals, distinguishing the situation of insect damage to food crops, checking the stock in warehouses, or image recognition of an affected area for medical diagnosis. If the teacher data is not stored or updated in the step S301, the step 302 may be skipped.

The imaging condition analysis module 211 of the computer 200 analyzes the imaging condition of the teacher data in the memory unit 230 (Step S303). The imaging condition includes at least one of a resolution, the angle of a camera, and a magnification.

Then, the camera control module 212 of the computer 200 controls the camera 100 to image an object under the analyzed imaging condition (Step S304).

The imaging unit 10 of the camera 100 is controlled by the computer 200 to take an image such as a still or moving image of an object under the specified image condition (Step 305).

FIG. 10 shows one example where the camera 100 images an object 500. This example shows that the camera control module 212 of the computer 200 controls the camera 100 connected with the communication network 300 to image ImageX under an imaging condition. If it is difficult to meet all the imaging conditions because the camera 100 is far from an object 500, the system may set priority on any one of the resolution, the angle of a camera, and the magnification, or the user may specify the priority.

First, the control unit 110 of the camera 100 transmits a taken image to the computer 200 through the communication unit 120 (Step S306).

The computer 200 acquires the image data through the communication unit 220 (Step S307). The received image data may be stored in the memory unit 230.

Finally, the control unit 210 of the computer 200 analyzes the image data based on the result of the machine learning performed in the step S302 (Step S308). ImageX has the imaging condition of "the resolution: 640×480 ppi, the angle of a camera: 30 degrees, and the magnification: life size" that is the same as the teacher data. This results in high identification accuracy in a short time on the image analysis. The image analysis is appropriate for the purpose of the system, such as face recognition to identify individuals, distinguishing the situation of insect damage to food crops, checking the stock in warehouses, or image recognition of an affected area for medical diagnosis.

As described above, the present invention can provide a system and a method for controlling a camera and a program to improve the detection and the identification accuracy of an object in image analysis in a camera control system that controls a camera used to take an image to be analyzed by artificial intelligence.

Teacher Data Selection Process

Figure 4:
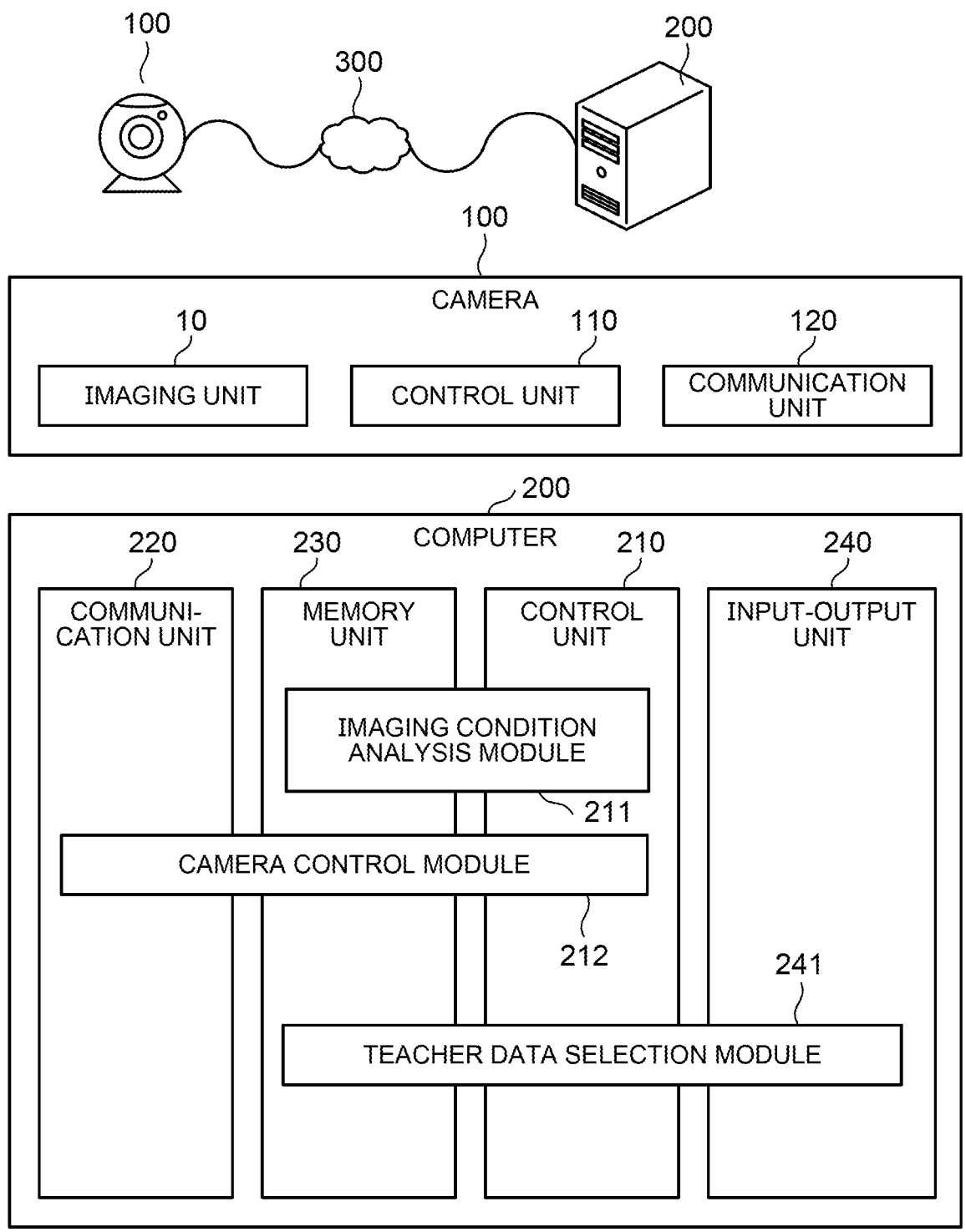
FIG. 4 shows a functional block diagram of the camera 100 and the computer 200 to illustrate the relationship among the functions for the teacher data selection process.
Figure 5:
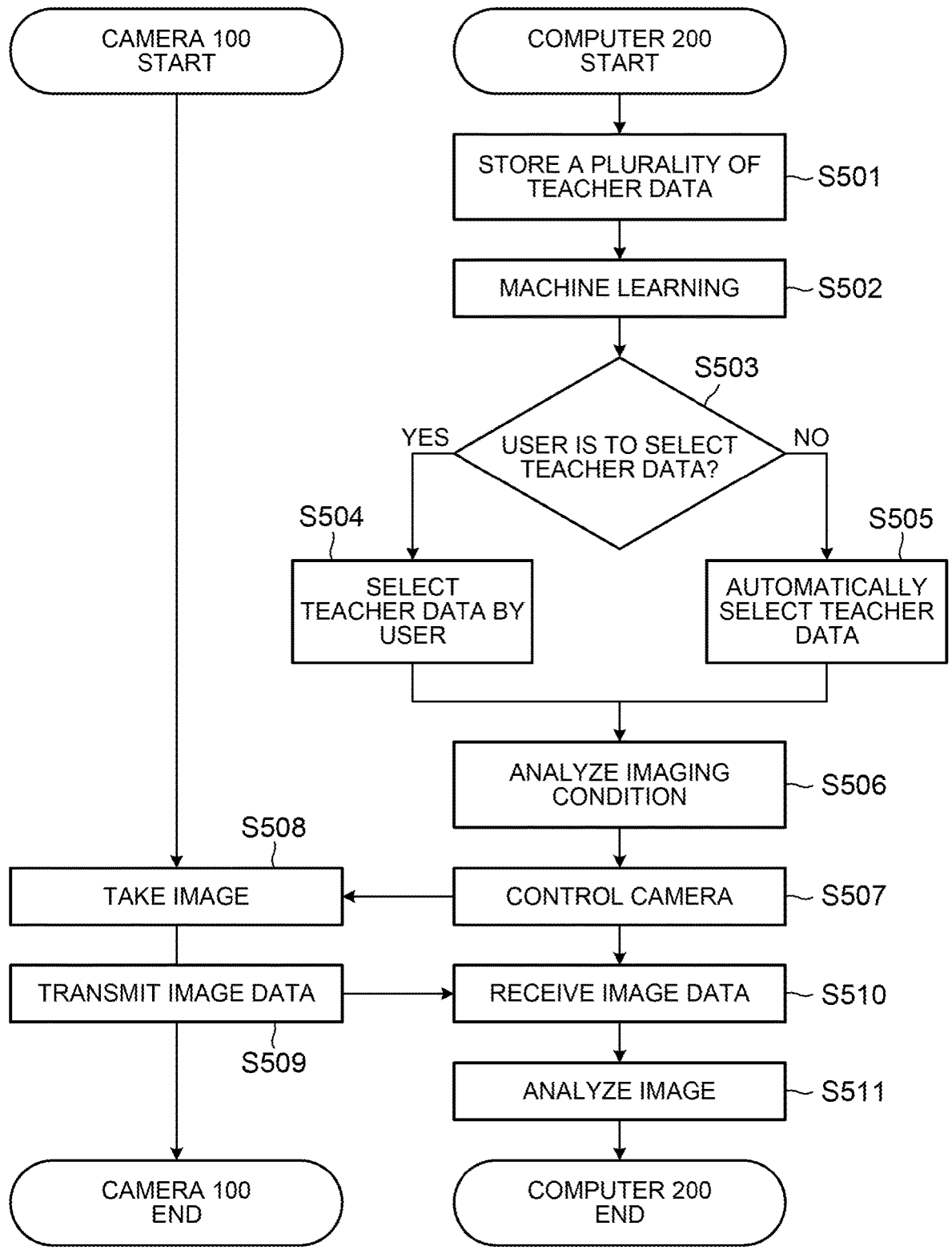
FIG. 5 shows a flow chart of the camera 100 and the computer 200 for the teacher data selection process.

FIG. 4 shows a functional block diagram of the camera 100 and the computer 200 to illustrate the relationship among the functions for the teacher data selection process. In addition to the configuration of FIG. 2, the input-output unit 240 of the computer 200 achieves a teacher data selection module 241 in cooperation with the control unit 210 and the memory unit 230. FIG. 5 shows a flow chart of the camera 100 and the computer 200 for the teacher data selection process. The tasks executed by the modules will be described below with this process. Since the process of the steps S501 to S502 shown in FIG. 5 corresponds to that of the steps S301 to S302 shown in FIG. 3, the process from the step S503 will be described below. If a plurality of teacher data have already been stored in the same way as the step S301, the step S501 may be skipped If the teacher data is not stored or updated in the step S501, the step S502 may be skipped.

The teacher data selection module 241 prompts the user to determine whether or not to select teacher data through the input-output unit 240 (Step S503). The determination of whether or not the user is to select teacher data may be stored in the memory unit 230 as settings to use in the later process.

If the user is to select teacher data, the user is prompted to select teacher data (Step S504). To prompt the user to select teacher data, teacher data is presented by the output function such as the display, the voice output, etc., of the input-output unit 240. The user selects appropriate teacher data by using the input function.

Figure 11:
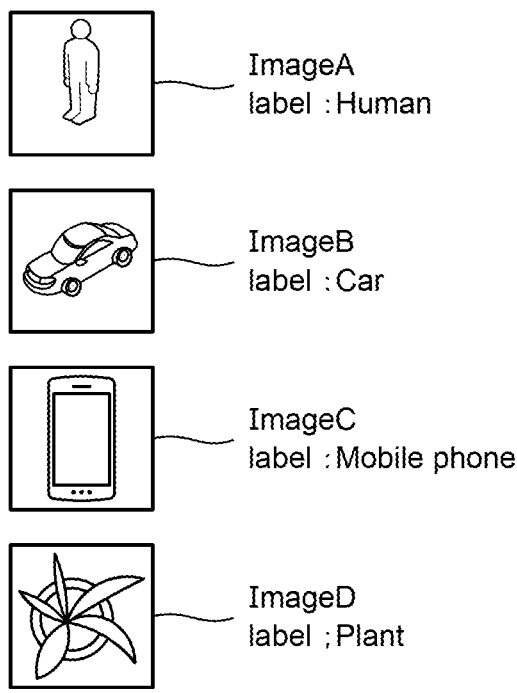
FIG. 11 shows a table illustrating one example of the data structure of the teacher data.

FIG. 11 shows a table illustrating one example of the data structure of the teacher data. The teacher data has a label that is attached to an image to indicate what the object is. In the example of FIG. 11, the labels "Man," "Car," "Mobile phone," and "Plant" are associated with the images "ImageA," "ImageB," "ImageC," and "ImageD," respectively. If the imaging condition of teacher data has already been analyzed, the resolution, the angle of a camera, the magnification, etc., may be stored together with teacher data. FIG. 11 shows an example where the imaging conditions of "Teacher data 1", "Teacher data 2", and "Teacher data 3" have already been analyzed. In this example, a resolution, the angle of a camera, a magnification, and a distance are stored as the analyzed imaging condition together with teacher data.

In the step S504, for example, images and labels as shown in the lower side of FIG. 11 may be displayed on the input-output unit 240 to prompt the user to select teacher data. If the user knows what the object to be imaged is, selecting teacher data with the same label can improve the identification accuracy of the image analysis. Furthermore, if the user selects teacher data from a large number of teacher data, it is hard to select teacher data. If there are a plurality of teacher data with the same label, only the typical teacher data may be displayed.

If the user does not select teacher data, the computer 200 automatically select teacher data (Step S505). If the computer 200 knows what the object to be imaged is, selecting teacher data with the same label can improve the identification accuracy of the image analysis. If the computer 200 does not know what the object to be imaged is, teacher data may be selected in descending order of identification accuracy of the image analysis. If there are teacher data that have already been analyzed, teacher data that suit to the function of imaging unit 10 of the camera 100 and the imaging conditions such as the resolution, the angle of the camera, and the magnification may be selected.

Then, the imaging condition of the teacher data selected in the previous step is analyzed (Step S506). Since the process of the steps S506 to S511 shown in FIG. 5 corresponds to that of the steps S303 to S308 shown in FIG. 3, the explanation of the process of the steps S506 to S511 will be omitted.

As described above, the present invention can provide a system and a method for controlling a camera and a program to more improve the detection and the identification accuracy of an object in image analysis by selecting teacher data in a camera control system that controls a camera used to take an image to be analyzed by artificial intelligence.

Receiving Process

Figure 6:
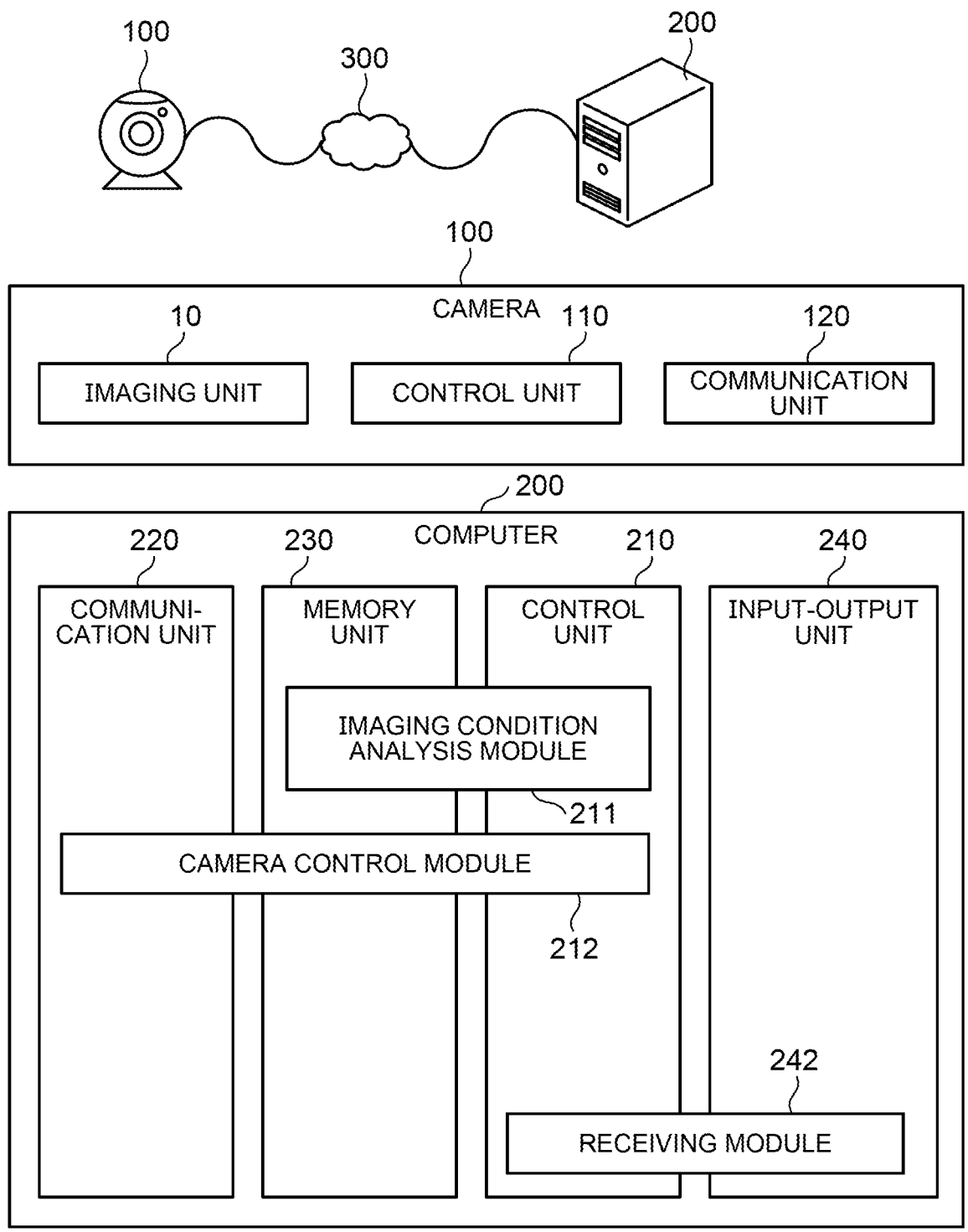
FIG. 6 shows a functional block diagram of the camera 100 and the computer 200 to illustrate the relationship among the functions for the receiving process that receives teacher data.
Figure 7:
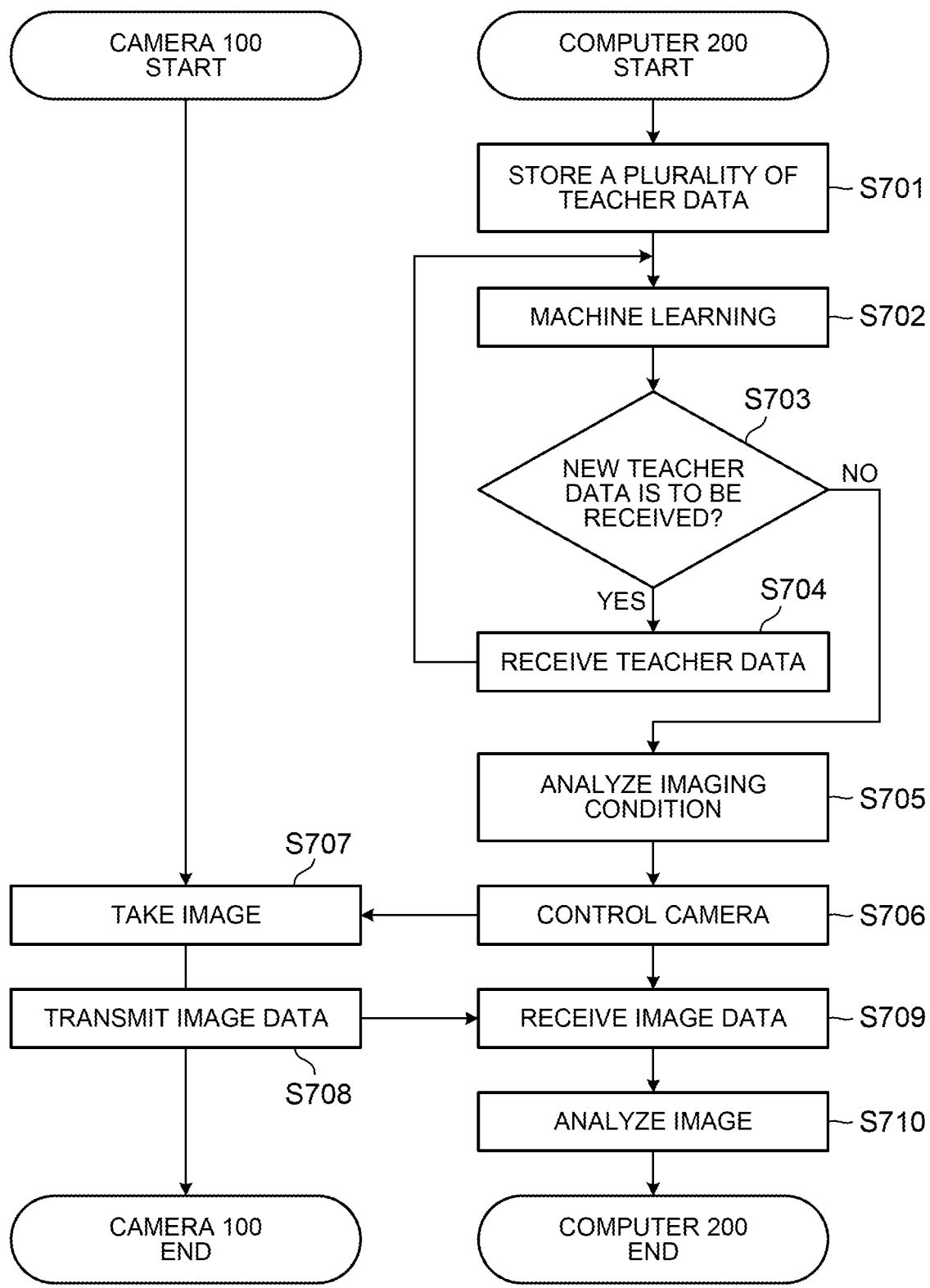
FIG. 7 shows a flow chart of the camera 100 and the computer 200 for the receiving process that receives teacher data.

FIG. 6 shows a functional block diagram of the camera 100 and the computer 200 to illustrate the relationship among the functions for the receiving process that receives teacher data. In addition to the configuration of FIG. 2, the input-output unit 240 of the computer 200 achieves a receiving module 242 in cooperation with the control unit 210. FIG. 7 shows a flow chart of the camera 100 and the computer 200 for the receiving process that receives teacher data. The tasks executed by the modules will be described below with this process. Since the process of the steps S701 to S702 shown in FIG. 7 corresponds to that of the steps S301 to S302 shown in FIG. 3, the process from the step S703 will be described below.

The receiving module 242 checks whether or not to receive new teacher data (Step S703).

If new teacher data is to be received as the result of the check in the step S703, the receiving module 242 receives teacher data from the user (Step S704). The received teacher data is stored in the memory unit 230 together with the image and the label. If added to the example of FIG. 11, teacher data only has to be stored together with a label as "ImageE." Images that were taken in the past may be used as teacher data to be newly added. In this case, the result of the image analysis on imaging may be automatically added as a label. Alternatively, the user may input a label when teacher data is added. The number of teacher data to be newly input may be one or more.

If teacher data is not newly input, the process proceeds to the next step S705 for the imaging condition analysis. Since the process of the steps S705 to S710 shown in FIG. 7 corresponds to that of the steps S303 to S308 shown in FIG. 3, the explanation of the process of the steps S705 to S710 will be omitted.

As described above, the present invention can provide a system and a method for controlling a camera and a program that is capable to add useful data by receiving teacher data to more improve the detection and the identification accuracy of an object in image analysis in a camera control system that controls a camera used to take an image to be analyzed by artificial intelligence.

Flight Control Process

Figure 8:
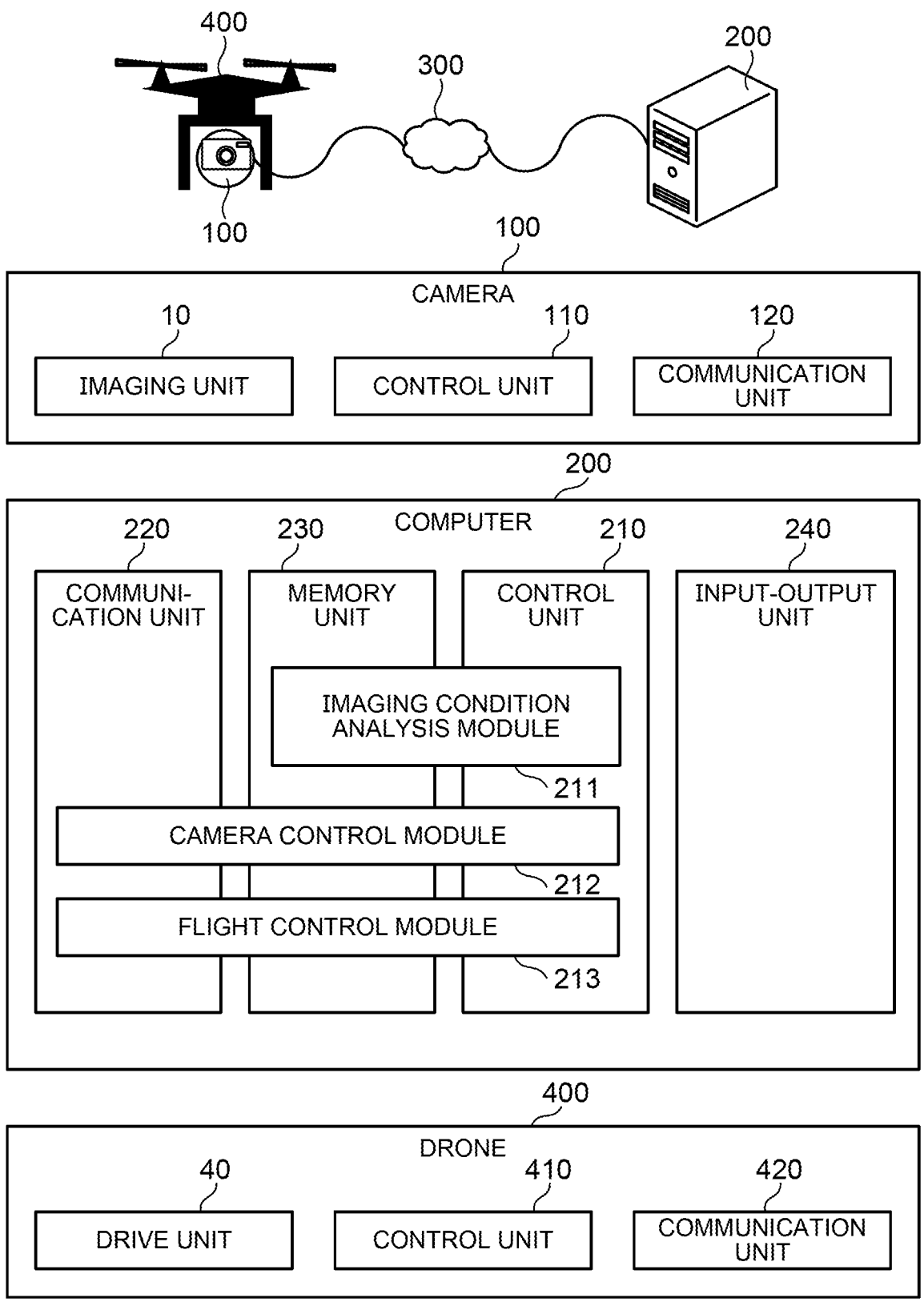
FIG. 8 shows a functional block diagram of the camera 100, the computer 200, and the drone 400 to illustrate the relationship among the functions.

FIG. 8 shows a functional block diagram of the camera 100, the computer 200, and the drone 400 to illustrate the relationship among the functions. The drone 400 is capable to move, provided with a camera 100. The camera 100 may be provided directly in the drone 400 or may communicate with the computer 200 and the drone 400 through the communication unit 120. In addition to the configuration of FIG. 2, the control unit 210 of the computer 200 achieves a flight control module 213 in cooperation with the communication unit 220 and the memory unit 230. The drone 400 includes a drive unit 40, a control unit 410, and a communication unit 420. The drone is an uninhabited mobile object that is controllable through a communication system such as radio, Wi-Fi®, or Bluetooth® or through automatic operation. Typically, the drone mostly refers to an uninhabited airborne vehicle. However, the drone herein refers to not only flies in the air as aircrafts but also those moves on or under the ground, on or under water, etc. The communication network 300 may be a public line network such as the Internet or a private line network, which enables the communications between the camera 100 and the computer 200 and between the drone 400 and the computer 200.

The drone 400 is provided with propellers such as rotary wings, wheels, and screws in the drive unit 40 and moved by driving them. The drone 400 only has to enable unmanned moving, regardless of the type of the propellers.

The control unit 410 includes a CPU, a RAM, and a ROM.

The communication unit 420 includes a device that is communicative to other devices, such as a Wi-Fi® enabled device complying with, for example, IEEE 802.11, or a wireless device complying with the IMT-2000 standard such as the third and the fourth generation mobile communication systems.

Figure 9:
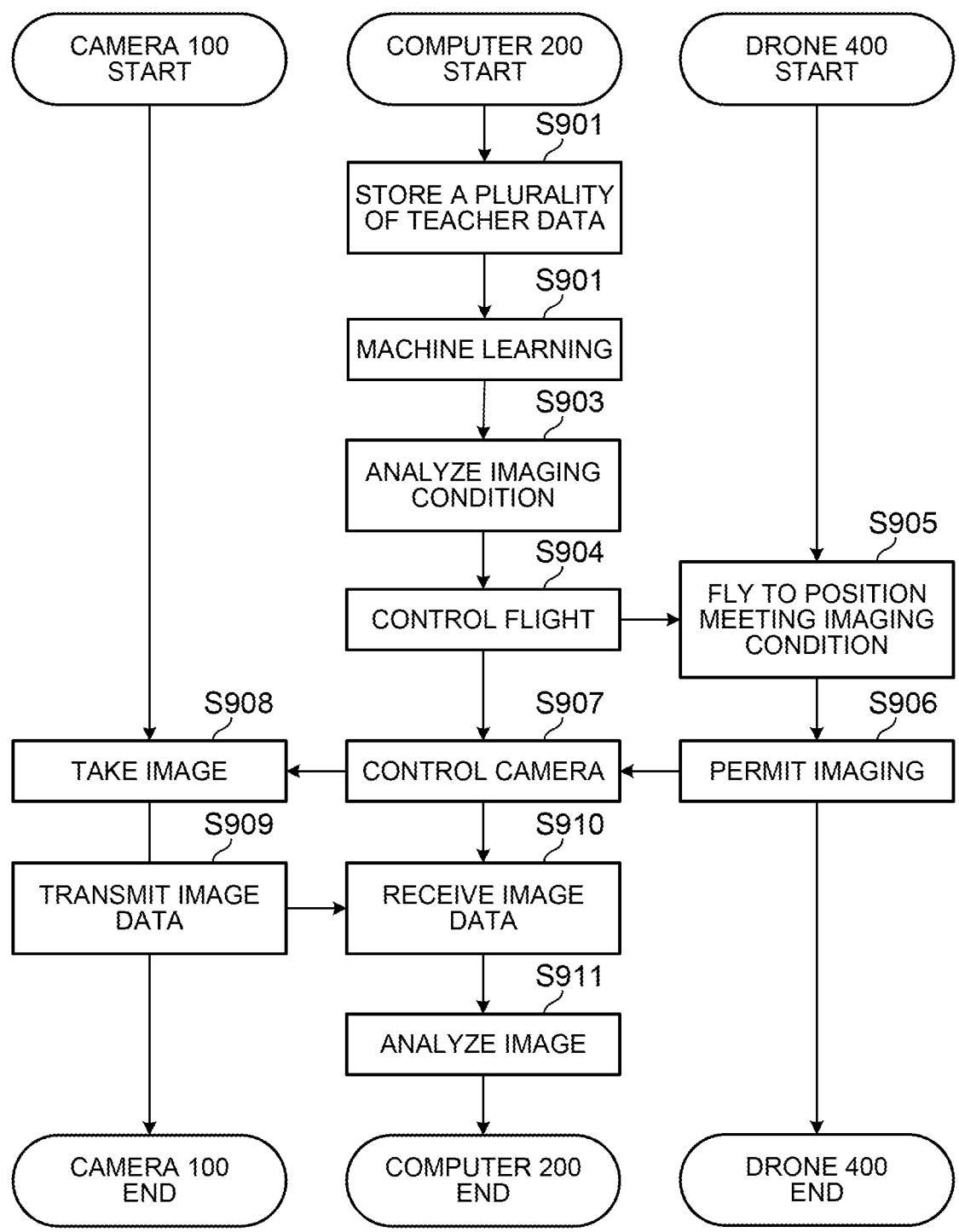
FIG. 9 is a flow chart of the camera 100, the computer 200, and the drone 400 for the flight control of the drone 400 provided with the camera 100.

FIG. 9 is a flow chart of the camera 100, the computer 200, and the drone 400 for the flight control of the drone 400 provided with the camera 100. The tasks executed by the modules will be described below with this process. Since the process from of step S901 to S903 shown in FIG. 9 corresponds to that from of step S301 to S303 shown in FIG. 3, the process from the step S904 will be described below.

After the imaging condition is analyzed, the flight control module 213 controls the flight of the drone 400 (Step S904). The flight control is to move the drone 400 to a position that meets the imaging condition of an object 500. In this example, the drone 400 is an unmanned air vehicle to fly. However, if the drone 400 moves on or under the ground, or on or under water, the drone 400 is controlled to move a position that meets the imaging condition of an object 500 in the same way.

After receiving the flight control through the communication unit 420, the drone 400 controls the drive unit 40 by the control unit 410 and flies to a position that meets the imaging condition of an object 500 (Step S905).

After moving to a position that meets the imaging condition, the drone 400 notifies imaging permission to the computer 200 (Step S906). If being unable to move to a position that meets the imaging condition, the drone 400 may notify error to the computer 200 and ends the process.

After receiving an imaging permission, the camera control module 212 of the computer 200 controls the camera 100 to image an object under the imaging condition analyzed in the step S903 (Step S907). Since the process of the steps S907 to S911 shown in FIG. 9 corresponds to that of the steps S304 to S308 shown in FIG. 3, the explanation of the process of the steps S907 to S911 will be omitted.

As described above, the present invention can provide a system and a method for controlling a camera and a program to more improve the detection and the identification accuracy of an object in image analysis by moving the drone to a position that meets the imaging condition in a camera control system that controls a camera used to take an image to be analyzed by artificial intelligence.

Process to Acquire Angle of Camera

The camera 100 in the present invention is also capable to determine the distance to an object or to image an object from two or more different directions at the same time. The distance can be acquired from a sensor, etc., of the camera 100. If an object can be imaged from the two or more different directions at the same time, the distance can be determined by learning the length of the difference between the images taken by the two or more cameras and an actual distance. Moreover, the determined distance can be used to calculate the angle of a camera 100. Since how to determine the distance by the use of the two or more cameras is known as an existing technology, how to acquire the angle of a camera 100 will be explained below with reference to FIG. 12.

Figure 12:
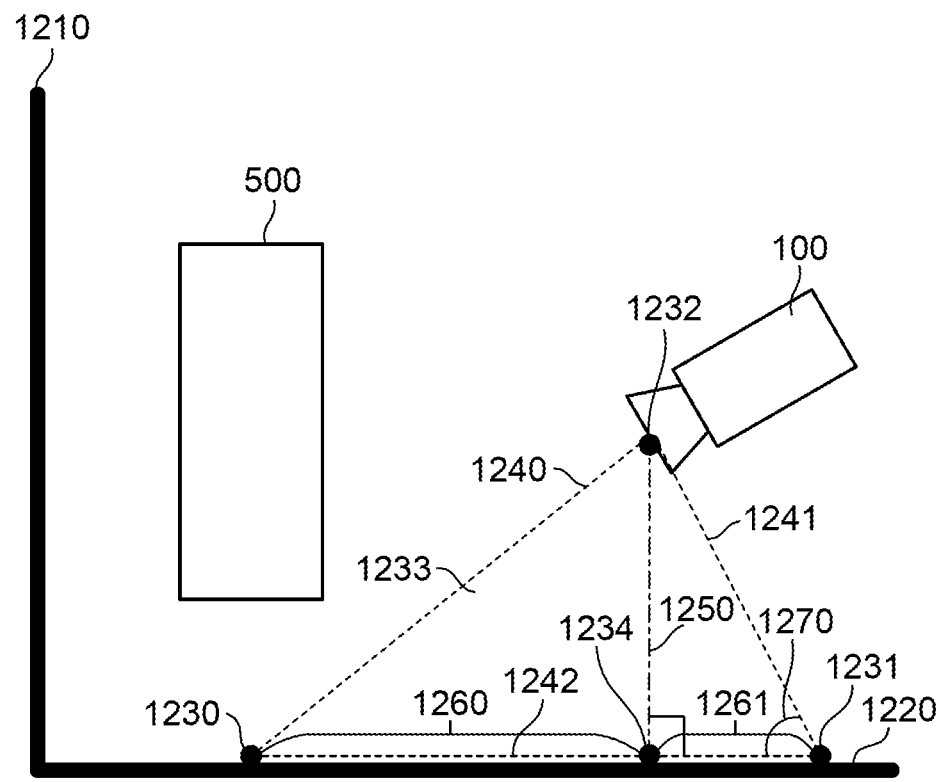
FIG. 12 schematically shows how the camera 100 acquires its angle.

FIG. 12 schematically shows how the camera 100 acquires its angle. In FIG. 12, the camera 100 is imaging an object 500, a wall 1210, and a floor 1220. The camera 100 or the computer 200 analyzes an image. If acquiring the angle of a camera 100, the camera 100 or the computer 200 recognizes the maximum area with a same pattern in an image as a plane such as a floor or a ground and acquires the angle of the camera 100 based on the inclination of the plane. In this example, the floor 1220 corresponds to the plane.

The angle of a camera 100 may be acquired by the camera 100 or the computer 200. However, in the following description, the computer 200 acquires the angle of a camera 100 for the simplification. The computer 200 extracts two predetermined positions 1230, 1231 on the floor 1220 as samples. The computer 200 connects the predetermined positions 1230, 1231 and the center position 1232 of the imaging location to form a triangle 1233. The triangle 1233 has three sides 1240, 1241, 1242. The computer 200 forms a perpendicular line 1250 from the center position 1232 to the floor 1220 and then the intersection point 1234 of the side 1242 with the perpendicular line 1250. The computer 200 learns the length of the difference between the images taken by two or more cameras and an actual distance, estimates the distance, and then calculates the lengths of the sides 1240, 1241 and the perpendicular line 1250. The computer 200 calculates the lengths of the line segment 1260 connecting the predetermined position 1230 with the intersection point 1234 and the line segment 1261 connecting the predetermined position 1231 with the intersection point 1234 in the side 1242. The computer 200 calculates the angle 1270 by trigonometric substitution and acquires this angle 1270 as the three-dimensional angle of the camera 100.

As described above, the present invention can calculate the distance to an object and the angle in the horizontal direction when the image is taken, by the use of the function to take an image of an object from two or more different directions at the same time, even if the camera 100 has no functions to determine the distance to an object.

To achieve the means and the functions that are described above, a computer (including a CPU, an information processor, and various terminals) reads and executes a predetermined program. For example, the program may be provided from a computer through a network, specifically, through Software as a Service (SaaS) or may be provided in the form recorded in a computer-readable medium such as a flexible disk, CD (e.g., CD-ROM), DVD (e.g., DVD-ROM, DVD-RAM), or a compact memory. In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

100 Camera
200 Computer
300 Communication network
400 Drone
500 Object

What is claimed is:

1. A system for controlling a camera used to take an image to be analyzed by artificial intelligence, the system comprising:
a memory device that stores a plurality of teacher data, each of the plurality of teacher data associating an image data with a label that indicates what an object of the image data is and an imaging condition of the image data; and
a processor that:
performs machine learning for an image analysis based on the plurality of teacher data;
selects a teacher data among the plurality of teacher data;
analyzes the imaging condition of the selected teacher data, the imaging condition including at least one of a resolution, the angle of a camera, and a magnification; and
controls a camera to take an image under the analyzed imaging condition.

2. The system according to claim 1, wherein the processor prompts a user to determine whether or not to select a teacher data among the plurality of teacher data,
wherein the processor presents the plurality of teacher data and receives a selection of a teacher data from a user when the user selects the teacher data, and
wherein the processor selects a teacher data appropriate for an object to be imaged, a teacher data with high identification accuracy of image analysis, or a teacher data that meets a function of the camera and an imaging condition when the user does not select the teacher data.

3. The system according to claim 1, further comprising a communication device that receives input of the teacher data.

4. The system according to claim 1, wherein the processor controls a drone to fly to a position that meets the analyzed imaging condition when the camera is provided in the drone.

5. The system according to claim 1, wherein the processor:
displays an image of the image data and the label associated by each of the plurality of teacher data; and
receives a selection of a teacher data from a user based on the image and the label associated with each of the plurality of teacher data.

6. A method for controlling a camera used to take an image to be analyzed by artificial intelligence, the method comprising:
storing a plurality of teacher data, each of the plurality of teacher data associating an image data with a label that indicates what an object of the image data is and an imaging condition of the image data;
performing machine learning for an image analysis based on the plurality of teacher data;
selecting a teacher data among the plurality of teacher data;
analyzing the imaging condition of the selected teacher data, the imaging condition including at least one of a resolution, the angle of a camera, and a magnification; and
controlling a camera to take an image under the analyzed imaging condition.

7. The method according to claim 6, wherein selecting the teacher data among the plurality of teacher data includes:
displaying an image of the image data and the label associated by each of the plurality of teacher data; and
receiving a selection of a teacher data from a user based on the image and the label associated with each of the plurality of teacher data.

8. A non-transitory computer-readable medium that stores a program to cause a system for controlling a camera used to take an image to be analyzed by artificial intelligence to execute:
storing a plurality of teacher data, each of the plurality of teacher data associating an image data with a label that indicates what an object of the image data is and an imaging condition of the image data;
performing machine learning for an image analysis based on the plurality of teacher data;
selecting a teacher data among the plurality of teacher data;
analyzing the imaging condition of the selected teacher data, the imaging condition including at least one of a resolution, the angle of a camera, and a magnification; and
controlling a camera to take an image under the analyzed imaging condition.

9. The non-transitory computer-readable medium according to claim 8, wherein selecting the teacher data among the plurality of teacher data includes:
displaying an image of the image data and the label associated by each of the plurality of teacher data; and
receiving a selection of a teacher data from a user based on the image and the label associated with each of the plurality of teacher data.

* * * * *